Figure 3:
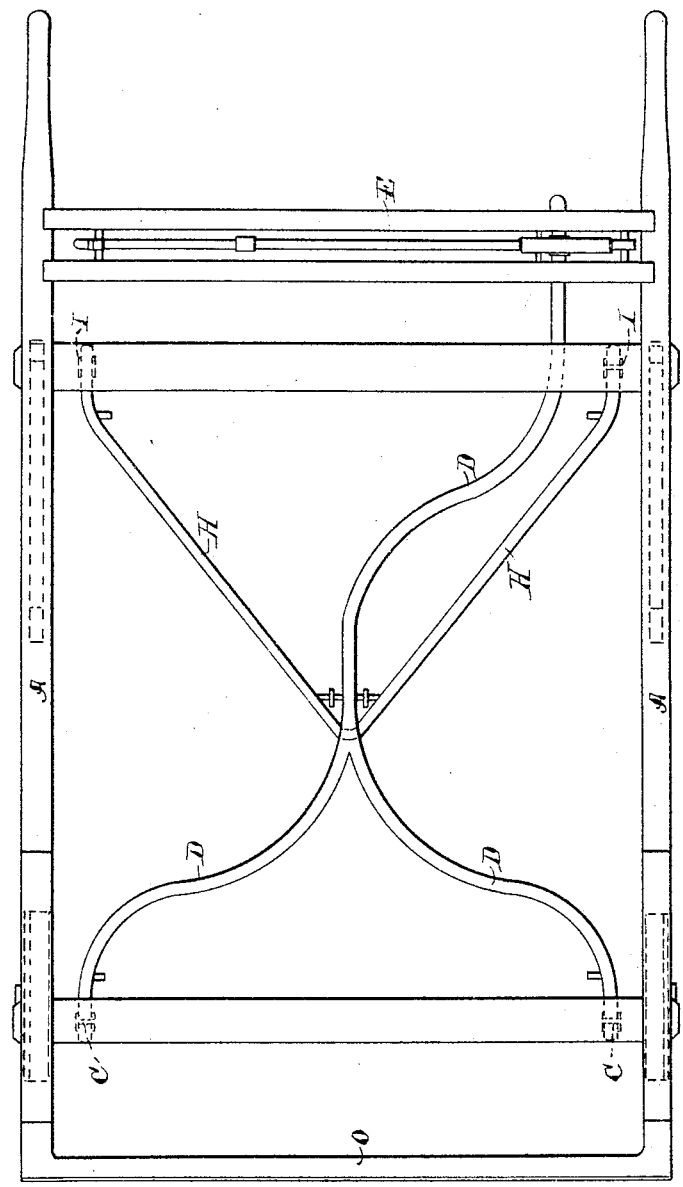

(No Model.) 2 Sheets—Sheet 1.
O. W. PARSELL.
WEIGHING TRUCK.
No. 531,963. Patented Jan. 1, 1895.
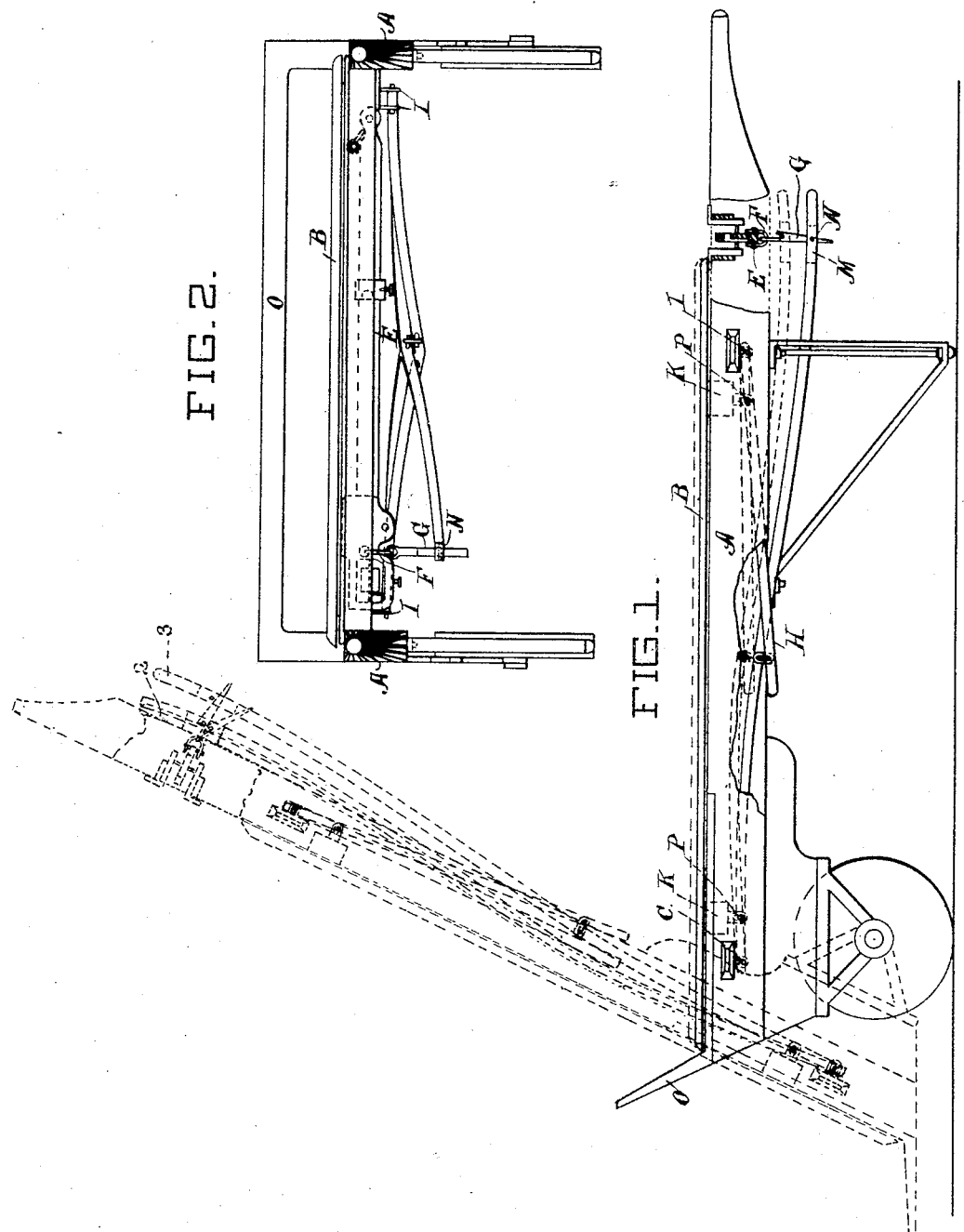
ATTEST_
Walter E. Allen
Walter Allen
INVENTOR_
Orlando W. Parsell.
BY Knight Bros.
ATTORNEYS.

(No Model.) 2 Sheets—Sheet 2.

O. W. PARSELL.
WEIGHING TRUCK.

No. 531,963. Patented Jan. 1, 1895.

ATTEST.
Walter E. Allen
Walter Allen

INVENTOR.
Orlando W. Parsell
BY Knight Bros.
ATTORNEYS.

United States Patent Office.

ORLANDO W. PARSELL, OF FLUSHING, MICHIGAN.

WEIGHING-TRUCK.

SPECIFICATION forming part of Letters Patent No. 531,963, dated January 1, 1895.

Application filed March 2, 1894. Serial No. 502,104. (No model.)

*To all whom it may concern:*

Be it known that I, ORLANDO W. PARSELL, a citizen of the United States, and a resident of Flushing, in the county of Genesee and State of Michigan, have invented a new and useful Improvement in Weighing-Trucks, of which the following is a specification.

My invention relates to certain improvements in weighing trucks, and especially to the form of truck for which Letters Patent were issued to Elmer E. Chandler July 5, 1892, No. 478,403, and the improvement consists in the automatic device for holding and shifting the weighing lever that raises and lowers the platform.

Figure 1 shows in full lines a side view of my truck in a horizontal position and also in dotted lines its weighing, and its raised position for loading, with my improvement in the different positions it assumes. Fig. 2 is a front view. Fig. 3 is a top view.

In the drawings A represents the truck, and B the platform of the scales which also forms the top of the truck. At the rear of the truck, pivoted at C to each side of the truck, and also at K to lugs P extending down from the platform is the Y-shaped raising and weighing lever D, the stem of the lever extending out beyond the front of the truck forming a handle. At the front of the truck it is connected to the weighing or scale beam E by the link F, and the pendent catch G. At the fork of the Y-shaped lever, and pivoted underneath it, is a V-shaped lever H, which extends above the lever D at the front where it is pivoted to lugs I to each side of the truck and also at K to lugs P extending down from each side of the platform.

When the truck is in horizontal position and it is desired to raise the platform and weigh goods on it, the operator takes hold of the handle or front part of lever D, extending beyond the platform and raises it into the position shown in dotted lines (Fig. 1), when the pendent catch G, playing in the slot M, in the lever D, swings of its own gravity under the pin N, in the slot M, and holds the handle and weighing levers up. The raising of the handle or lever D, also raises lever H, and elevates the platform free from the truck as shown in dotted lines, and the scale is ready for weighing.

When it is desired to load the truck it is raised to the position shown in dotted lines and the apron O of the truck run under the box or whatever it is desired to load. The handle D before loading is raised slightly, as shown in dotted lines 2 (raised position) when the pendent catch swings out from under pin N, when lever D is lowered as shown in dotted lines 3. The lowering of lever D lowers lever H, and platform B, allowing the platform to rest firmly on the truck where it remains until lever D is raised again and pin N, engages in catch G.

What I claim is—

1. The weighing truck comprising the lever H, the extended weighing lever D, having the slot M, and pin N, the scale-beam E and the pendent catch G, playing in slot M, as and for the purpose set forth.

2. The combination with the lever D having the slot M and pin N pivoted to the truck frame and connected to the platform lugs at the rear of the truck, of the lever H pivoted to the lever D at its center, and to the lugs on the front of the platform, the scale-beam E, and the pendent catch, as and for the purpose set forth.

ORLANDO W. PARSELL.

Witnesses:
  WILBUR A. GINN,
  JAMES F. FISHER.